United States Patent [19]
Niemeyer

[11] 3,752,550
[45] Aug. 14, 1973

[54] HAMPER CART

[76] Inventor: Lois Niemeyer, P.O. Box 76, Humboldt, Ill. 61931

[22] Filed: May 19, 1972

[21] Appl. No.: 255,171

[52] U.S. Cl.................. 312/237, 312/244, 312/250, 312/280
[51] Int. Cl.. A47b 83/00, A47b 95/02, A47b 81/00
[58] Field of Search................... 312/237, 246, 250, 312/270, 330, 211, 212, 280

[56] References Cited
UNITED STATES PATENTS

| | | | |
|---|---|---|---|
| 2,732,274 | 1/1956 | Cotton | 312/280 |
| 376,070 | 1/1888 | Cobb et al. | 312/250 |
| 542,341 | 7/1895 | Little | 312/198 |
| 1,798,800 | 3/1931 | Macknight | 312/198 |
| 3,286,752 | 11/1966 | Duryee | 232/43.2 |

Primary Examiner—Paul R. Gilliam

[57] ABSTRACT

A cart for laundry fits into a housing so to form with it an item of furniture such as a night table or a vanity; the cart consisting of a hamper basket mounted on caster wheels, and the housing including opposite side walls and a top wall so to enclose a space into which the cart is pushed, the front wall of the cart hamper thus forming the front wall of the night table or vanity.

1 Claim, 3 Drawing Figures

PATENTED AUG 14 1973　　　　　　　　　　　　　　3,752,550
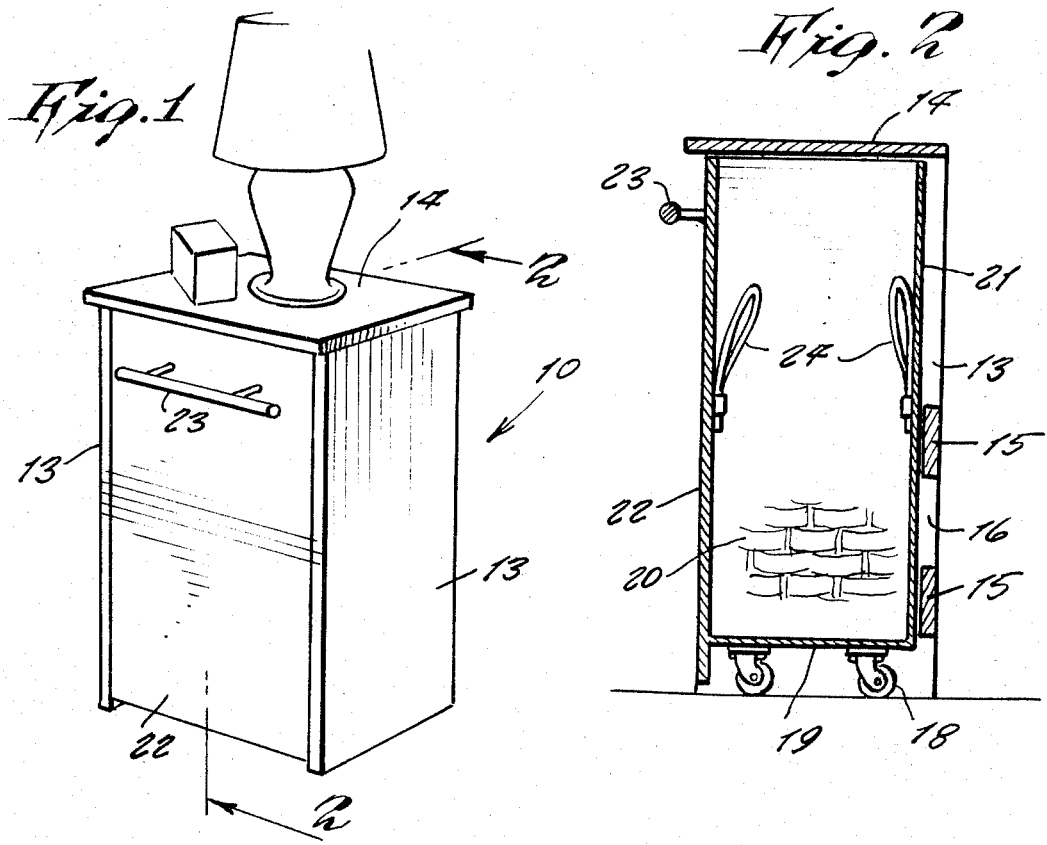
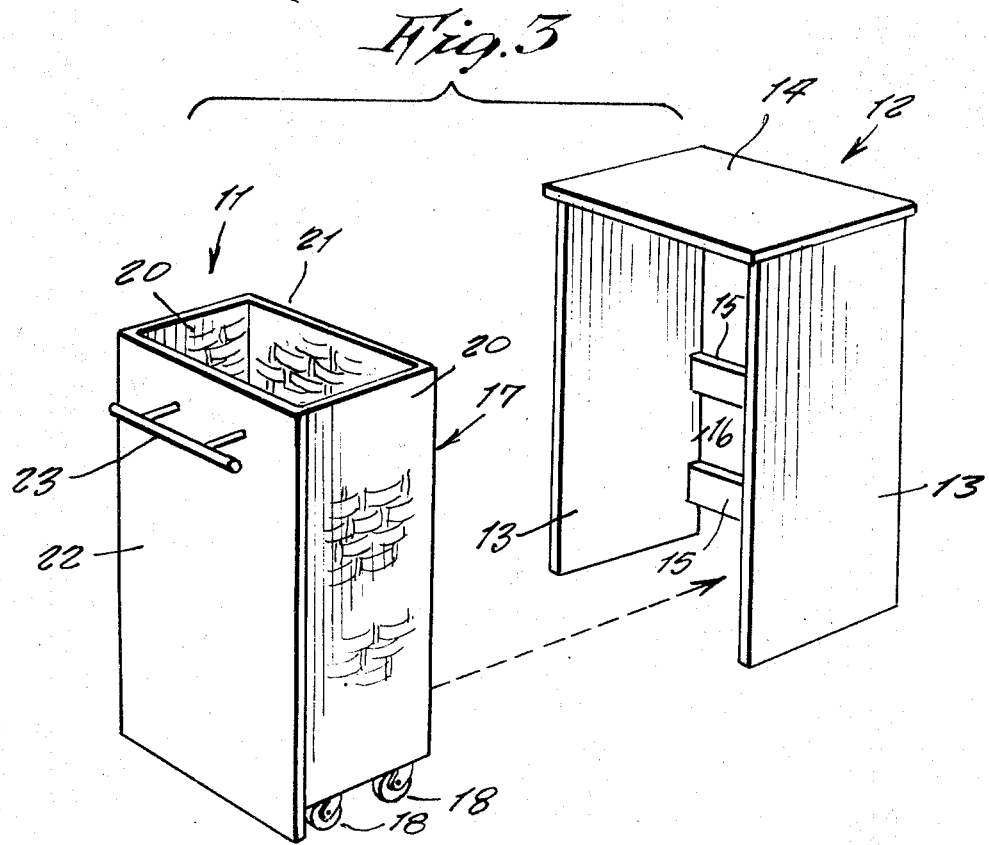

HAMPER CART

This invention relates generally to combination furniture. More specifically it relates to a laundry hamper.

A principal object of the present invention is to provide a hamper cart which serves as an attractive and useful furniture in a home for other purposes.

Another object is to provide a hamper cart which together with a separate housing forms either a decorative vanity, a night table, or the like.

Yet another object is to provide a hamper cart which can be removed from the housing without disturbing any items placed upon the housing so that both can be independently used.

Other objects are to provide a hamper cart which is simple in design, inexpensive to manufacture, rugged in construction, easy to use, and efficient in operation.

These and other objects will be readily apparent upon a study of the following specification and the accompanying drawing, wherein:

FIG. 1 is a perspective view of the invention shown assembled.

FIG. 2 is a cross-sectional view taken on line 2—2 of FIG. 1.

FIG. 3 is a perspective view of the invention shown with cart pulled out of the housing.

Referring now to the drawing in detail, the reference numeral 10 represents a hamper cart assembly according to the present invention, wherein there is a cart 11 that is movable in and out of an enclosing shell or housing 12.

The housing consists of a pair of parallel, vertical, spaced apart side walls 13 and a horizontal top panel 14 secured thereupon. A pair of horizontal cross braces 15 between the rear edges 16 of side walls serves to strengthen the construction so that it will be rigid and not wobble. The housing components may be made either of wood, metal, or plastic, as desired by a manufacturer.

The cart 11 consists of a hamper 17 mounted upon swiveling caster wheels 18. The hamper consists of a horizontal bottom wall 19, parallel, vertical side walls 20, rear wall 21 and front wall 22. The side and rear walls may be made of reed, basket woven, or plastic. The front wall however should be of material that matches the top panel 14 of the housing so that together they form a harmonious appearing unit. The lower end of front wall 22 extends close to a floor so to hide from view the caster wheels. A decorative towel bar 23 is secured on the upper outer side of front wall 22 for use as a push and pull handle to move the cart. Half way down the inside of the basket, handles 24 of leather or other soft, durable material are provided to serve as a handhold or grip when carrying the cart such as when going up and down steps or transferring it to a car or to a laundromat machine. As shown in the drawing, both handles are alike and comprise upward long loops secured at their lower ends to the basket and shown being long enough so to be brought together to form the grip or handhold.

In daily use, the cart remains inside the housing and soiled linen and clothes can be placed therein by merely sliding the cart a little way out. On wash day the cart is pulled out and wheeled from room to room to pick up linen, and then moved to the laundry room.

While various changes may be made in the detail construction, it is understood that such changes will be within the spirit and scope of the present invention as is defined by the appended claims.

I claim:

1. In a hamper cart assembly, the combination of a separate housing and a cart movable in or out of said housing and which together form a decorative vanity or night table, said housing being comprised of a pair of side walls with a top panel secured on top, and a plurality of cross braces between a rear side edge of said side walls, said cart comprising a hamper mounted on caster wheels, said hamper including a bottom wall, opposite side and rear walls which can be of basket weave or the like for ventilation, and a front wall that matches a top wall of said housing, a towel bar being mounted on the outside of said cart front wall, and soft grip handles being secured inside said hamper on opposite walls thereof and located halfway down inside said hamper, so to serve as a handhold or grip, said loops each being sufficiently long so to allow being brought together in order to form said grip, said grip accordingly being located inside said basket.

* * * * *